March 10, 1970 — E. L. SWARTZ — 3,499,459
FLUERIC STALL SENSOR CIRCUIT
Filed Feb. 17, 1967

INVENTOR,
ELMER L. SWARTZ

United States Patent Office 3,499,459
Patented Mar. 10, 1970

3,499,459
FLUERIC STALL SENSOR CIRCUIT
Elmer L. Swartz, Falls Church, Va., assignor to the United States of America as represented by the Secretary of the Army
Filed Feb. 17, 1967, Ser. No. 617,780
Int. Cl. F15c 1/08, 1/12, 1/14
U.S. Cl. 137—81.5
1 Claim

ABSTRACT OF THE DISCLOSURE

A pickup probe is placed on an aircraft wing to measure stall and nonstall conditions thereon. A biased bistable amplifier is communicated to said pickup probe by a flow restrictor. During stall conditions the biased bistable amplifier will direct the power fluid it receives to a first output conduit while in nonstall conditions it will direct its power fluid to a second output conduit. The bias in the bistable amplifier is accomplished by communicating part of the power fluid the amplifier receives to a first control conduit therein.

---

This invention relates to fluid amplifiers, and in particular, to their use in sensing stall on aerodynamic surfaces. Stall on aerodynamic surface, such as an aircraft wing, is characterized by separation of fluid flow from the aerodynamic surface. The attachment of flow on an aerodynamic surface is brought about by the movement of the aerodynamic surface. The forward movement of the aerodynamic surface also gives rise to "lift" which enables the aircraft to fly. When high velocity fluid is used to support an aircraft during flight it is extremely important to the pilot of the aircraft to know when the aircraft reaches the stall point, since, in effect it is at this point that the normal lift function of the aircraft ceases. Normally, the stall area of an aircraft wing progresses from the trailing edge towards the leading edge on the upper side of the aircraft wing. The rapidity of the stall progression and the percent of allowable wing area in stall before the aircraft begins to drop depends on the design. The point at which separation occurs at the edge of the lift area is known as the separation point and beyond which is a stall region. It is important for the pilot to know if the stall region has passed the separation point so the pilot can take certain well known actions to ensure that the stall region does not go past the separation point impairing the lift of the aircraft. Prior art devices to detect stall included fluid pressure and/or electrical devices which sent a signal to the pilot indicating stall. The devices in the past have tended to be unreliable, complex, and costly. Part of the reason for the failure of prior art devices was the entrance into the measuring device of dust and foreign matter from ambient destroying the reliability of the device.

It is therefore an object of this invention to provide an improved stall sensor capable of withstanding environmental vibrations without affecting the reliability of the stall sensor.

Another object of this invention is to provide an improved stall sensor which cannot lose operational functionality because of foreign matter entering the stall sensor.

Still another object of my invention is to provide an improved stall sensor that is easy to make yet requires little or no maintenance.

Other objects and features of the present invention will be apparent from the following description and drawings wherein.

Briefly, my stall sensor includes a biased fluid amplifier that discharges part of its power fluid out a first control conduit to atmosphere by a probe placed in the aircraft wing at the point it is desired to detect the stall. If the aircraft is not in a stalled condition the bias of the amplifier will control the power jet directing the power fluid out a first output conduit while if the aircraft is in a stalled condition the amplifier will receive a signal overcoming the bias in the amplifier causing the power fluid to be directed to a different output conduit. The output conduits of the amplifier may be connected to a visual indicating means to indicate a stalled condition to the pilot.

Figure 2:
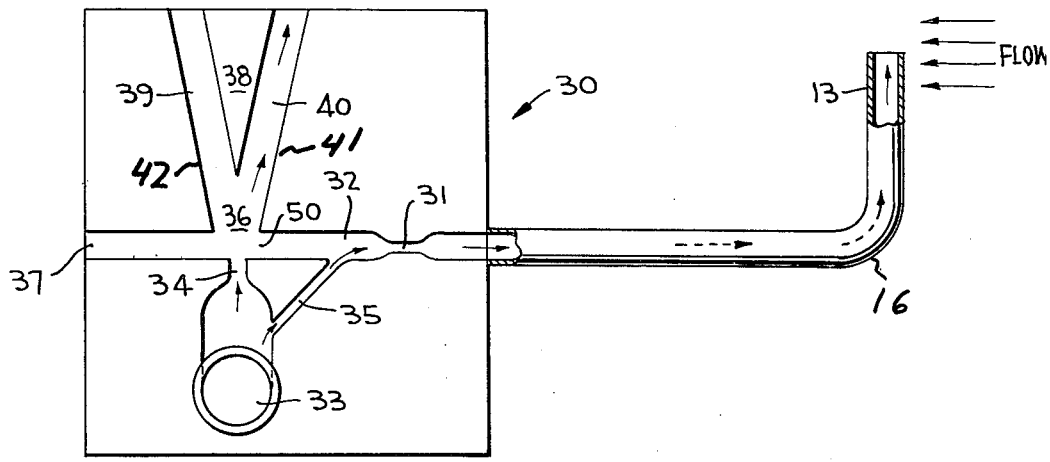
FIGURE 2 illustrates the flow in my stall sensor when the stall sensor is used in an aircraft that is in a stalled condition.
Figure 3:
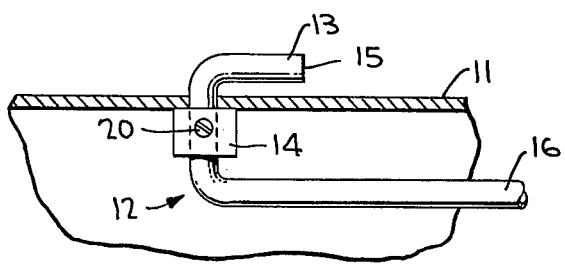
FIGURE 3 is a schematic representation of an aircraft wing using my novel stall sensor.

Referring to FIGURE 3, an aircraft wing 11 is shown having a stall sensor 12 mounted thereon. A hollow probe 13 extends above the surface of wing 11 and is bent to form an L. The end of probe 13 is positioned to be at an angle slightly removed from 90° to the normal flow of air over wing 11. Probe 13 is connected to a probe support 14 as is a conduit 16. Probe support 14 is an enclosed volume which communicates conduit 16 with pickup tube 13. Conduit 16 can be integral with probe support 14 or attached thereto in a manner well known in the art. Probe 13 is joined to support 14 through a hole in the top thereof (not shown) and held attached to probe support 14 by a set screw 20. It is obvious that with the use of the set screw the height of probe 13 above wing surface 11 can be varied. Probe 13, by conduit 16, is connected to a right control conduit 32 (FIGURE 2) of a biased fluid amplifier 30 by a flow restrictor 31. Biased fluid amplifier 30 is connected to a power source (not shown) by a conduit 33. A power nozzle 34 receives most of the power fluid and is positioned to direct the power fluid it receives to an interaction chamber 36 which is formed by a left side wall 42, a right side wall 41 and a splitter 38 positioned between said left side wall 42 and said right side wall 41. A left output conduit 39 is formed between splitter 38 and left side wall 42 and a right output conduit 40 is formed between splitter 38 and right side wall 41. A left control conduit 37 of constant cross sectional area continually communicates the interaction chamber 36 with atmosphere while right control conduit 32, via flow restrictor 31, communicates with pickup probe 13. A bias slot 35 communicates part of the power fluid from conduit 33 to right control conduit 32.

In normal operation the wing surface will not be in a "stalled" condition and the fluid will follow the pattern as shown in FIGURE 2. Part of the power fluid from the power source will enter slot 35 and will be transferred to control conduit 32. As will be recalled, in a nonstalled condition of an aircraft wing, the ambient air will be attached to the wing surface flowing thereover. As can be seen in FIGURE 2 pickup probe 13 is positioned to be approximately normal to the flow of ambient air over the aircraft wing and will entrain air therefrom. This will entrain fluid from right control conduit 32 drawing the fluid placed there by bias slot 35 past flow restrictor 31 to pickup tube 13. The entrainment of fluid from control conduit 32 will create a low pressure region at the intersection of control conduit 32 and interaction chamber 36 (50) which will draw the power fluid from power nozzle 34 to right side wall 41 and eventually to right output conduit 40. Right output conduit 40 and left output conduit 39 can be attached to opposite sides of a transparent cylinder having a movable disc therein. When output conduit 40 is pressurized the disc would move to one end of the cylinder indicating a nonstalled condition of the aircraft wing while when output conduit 39 is pressurized the disc would move to the opposite end of the cylinder indicating a stalled condition of the aircraft wing. The pilot by seeing the disc at the first end of the cylinder would quickly realize the aircraft was in a nonstalled condition and by seeing the disc at the opposite end of the cylinder would quickly realize the aircraft was in a stalled condition. Obviously, other pressure actuated indicating means, such as a pressure actuated switch which controls a bell or a light, could be used without departing from the scope of my invention.

Figure 1:
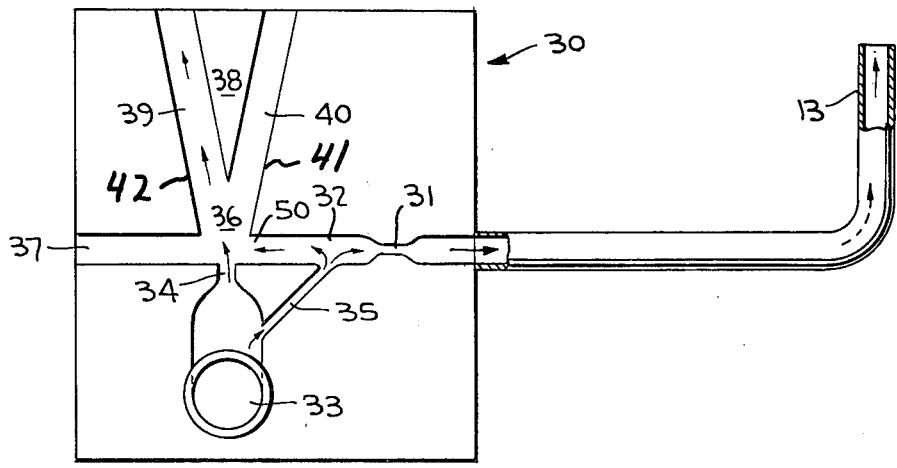
FIGURE 1 illustrates the flow in my stall sensor when the aircraft is not in a stall condition.

When the aircraft is in a stalled condition, as shown schematically by in FIGURE 1 the air flowing over wing 11 will not be attached thereto and therefore will not flow past pickup probe 13 and entrain fluid therefrom. The fluid in right control 32 will slowly flow past restrictor 31 to ambient by pickup probe 13. However, since there will be no entrainment of fluid in pickup probe 13 by ambient air only a small part of the fluid in control conduit 32 will go to ambient through pickup probe 13. A quantity of fluid not seeping into pickup probe 13 will, as seen in FIGURE 1, be directed through region 50 to impinge on fluid from nozzle 34 switching the power fluid from right output conduit 40 to left output conduit 39 providing a fluid signal that can be used, as described above, with a pressure actuated signalling device to indicate a stalled condition of the aircraft.

As can be seen from my description of the invention, I have invented a novel and simple means to measure and sense stall in an aircraft wing that will continually keep foreign particles from entering my measuring device by having a constant flow from the pickup probe to ambient.

Obviously, a biased amplifier with a different splitter arrangement, such as a blunt splitter, might be used without departing from the scope of my invention.

I wish it to be understood that I do not desire to be limited to the exact details of construction shown and described, for obvious modifications will occur to a person skilled in the art.

I claim as my invention:
1. A system for sensing stall and non-stall conditions on an aircraft comprising:
 (a) a pickup probe;
 (b) a fluid amplifier coupled to said pickup probe; said fluid amplifier comprising a source of power fluid, first and second output channels and first and second control channels;
 (c) a fluid bias channel providing a fluid flow path between said power source and said first control channel;
 (d) and a flow restrictor in said first control channel located between said bias channel and said pickup probe, whereby the flow of fluid adjacent said probe will reduce the pressure in said first control channel.

References Cited

UNITED STATES PATENTS

| | | | |
|---|---|---|---|
| 2,590,521 | 3/1952 | Dyche | 73—180 |
| 2,603,695 | 7/1952 | Campbell | 73—180 XR |
| 3,006,187 | 10/1961 | Wilkenson | 73—180 |
| 3,324,730 | 6/1967 | Bowles | 131—81.5 |
| 3,327,529 | 6/1967 | Bowles et al. | 73—180 |
| 3,331,379 | 7/1967 | Bowles | 137—81.5 |
| 3,367,581 | 2/1968 | Kizilos et al. | 137—81.5 XR |

SAMUEL SCOTT, Primary Examiner

U.S. Cl. X.R.

73—180